UNITED STATES PATENT OFFICE 2,685,594

MERCURY COMPOUNDS OF 2-(N-ALLYLCAR-BAMYL) PHENOXYACETIC ACID, SALTS THEREOF, AND METHOD FOR PREPARING SAME

Chester J. Cavallito, Decatur, Ill., assignor to Sterling Drug Inc., New York, N. Y., a corporation of Delaware No Drawing. Application April 4, 1952, Serial No. 280,649

4 Claims. (Cl. 260—434)

This invention relates to new organic mercury compounds and to a process for obtaining the same.

The new compounds of my invention have the structural formula

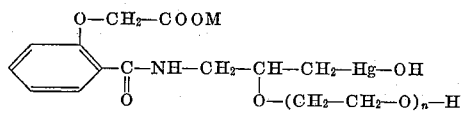

where $n$ is 1 or 2 and M is hydrogen or one equivalent of a non-toxic cation. The free acid form of these substances is conveniently obtained by interacting ethylene glycol or diethylene glycol with mercuric acetate and 2-(N-allylcarbamyl)-phenoxyacetic acid in accordance with the following equation:

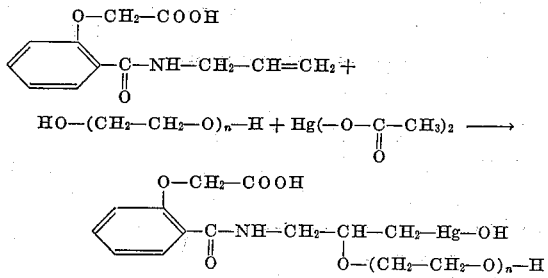

The carboxylic acid form of the compounds obtained by the above reaction is readily converted to any desired salt form by treating it with a base in conventional fashion, for example with a base M'—OH, wherein M' represents one equivalent of the appropriate non-toxic cation such as sodium, potassium, ammonium, diethanol-ammonium, etc.

The substances provided by my invention are useful as diuretic agents. For this use, the compounds are administered parenterally. Thus, I have found that my new mercurials produce satisfactory diuresis when administered intramuscularly in aqueous solution. The water-soluble sodium salts are especially useful forms for this purpose. When intramuscular injection is employed, it is preferable to combine my novel mercurial diuretic agents with theophylline, in accordance with the well-known and conventional practice of combining this latter substance with mercurials to improve absorption and to lessen local irritation of the tissues.

My invention is illustrated by the following examples without, however, being limited thereto.

EXAMPLE 1

2-[N-2-(2-hydroxyethoxy) - 3 - hydroxymercuri-propylcarbamyl]phenoxyacetic acid

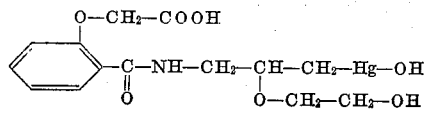

11.8 g. of 2-(N-allylcarbamyl)phenoxyacetic acid was dissolved in 50 ml. of hot ethylene glycol and to this solution there was added a solution of 15.9 g. of mercuric acetate in 50 ml. of dioxane. The mixture was then cooled and filtered, and the filtrate was allowed to stand at room temperature (circa 25° C.) for two days. After this period, the reaction mixture no longer gave a positive test for mercuric ion. A small amount of a gray precipitate was then removed from the reaction mixture by filtration, and the filtrate was allowed to stand overnight. The heavy white precipitate which had deposited from the reaction mixture was then collected on a filter, washed with a few ml. of alcohol and dried. There was thus obtained 8 g. of 2-[N-2-(2-hydroxyethoxy)-3-hydroxy-mercuripropylcarbamyl]phenoxyacetic acid, which melted with decomposition at 191-192° C. (cor.).

This product was found to be soluble (a) in N/5 diethanolamine solution to 25% weight/volume (maximum tested), the pH of the 1.0% solution being 8.7, (b) in dilute aqueous ammonium chloride solution, and (c) in aqueous sodium bicarbonate solution.

The compound was tested for diuretic activity in the following manner. The carboxylic acid obtained above was dissolved in aqueous sodium carbonate solution, thus forming a solution of the sodium salt,

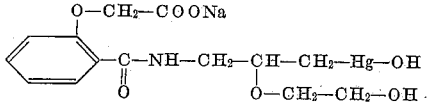

The pH of this solution was adjusted to 7.5–8.5 with 0.2 N HCl and there was then added theophylline amounting to half the weight of the sodium 2 - [N-2-(2-hydroxyethoxy)-3-hydroxy-mercuripropylcarbamyl]phenoxyacetate in the solution. The solution thus obtained was administered intramuscularly into rats at a dosage level of 2 mg. Hg/kg. and the urine of the rats was collected over a six-hour period. The rats injected with the test solution excreted an average of 32% greater volume of urine than a similar group of rats used as controls which received placebo injections.

EXAMPLE 2

2-{N-2-[-2-(2 - hydroxyethoxy)ethoxy] - 3 - hy-droxymercuripropylcarbamyl}phenoxyacetic acid

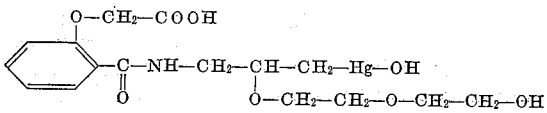

15.9 g. of mercuric acetate was dissolved in 150 ml. of dioxane and 11.8 g. of 2-(N-allylcarbamyl)-phenoxyacetic acid was dissolved in 50 ml. of diethylene glycol, and the two solutions were filtered to remove a small amount of insoluble material from each. The two filtrates thus obtained were mixed with each other and allowed to stand overnight at room temperature (circa 25° C.), and the residue was poured into 200 ml. of a 5% aqueous solution of sodium hydroxide. A black precipitate was removed from the solution by filtration, and the filtrate was acidified with dilute sulfuric acid. The solid product which precipitated from the acidified solution was collected on a filter, re-dissolved in alkali, and then re-precipitated with sulfuric acid. The solid product was dissolved in alkali and precipitated with dilute sulfuric acid once again, and the final product thus obtained was separated from the acidic solution, washed with a few ml. of ethanol and ethyl ether. This product was dried for fourteen hours at 100° C. at 2 mm. pressure. There was thus obtained 9 g. of 2-{N-2-[2-(2-hydroxyethoxy)-ethoxy]-3-hydroxymercuripropylcarbamyl}-phenoxyacetic acid as a white powder which melted with decomposition at 162–164° C. (cor.).

This product was found to be soluble (a) in N/5 diethanolamine solution to 7.7% weight/volume (maximum tested), the pH of the 1% solution being 8.3, (b) in dilute aqueous ammonium chloride solution, and (c) in aqueous sodium bicarbonate solution.

The compound was tested for diuretic activity in the following manner. The carboxylic acid obtained above was dissolved in aqueous sodium carbonate solution, thus forming a solution of the sodium salt,

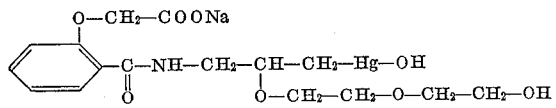

The pH of this solution was adjusted to 7.5–8.5 with 0.2 N HCl and there was then added theophylline amounting to half the weight of the sodium 2-{N-2-[2-(2-hydroxyethoxy)ethoxy]-3-hydroxymercuripropylcarbamyl} phenoxyacetate in the solution. The solution thus obtained was administered intramuscularly into rats at a dosage level of 8 mg. Hg/kg. and the urine of the rats was collected over a six-hour period. The rats injected with the test solution excreted an average of 73% greater volume of urine than a similar group of rats used as controls which received placebo injections.

EXAMPLE 3

*2-{N-2-[2-(2 - hydroxyethoxy) ethoxy] - 3 - hydroxymercuripropylcarbamyl}phenoxyacetic acid*

35 g. of mercuric acetate was dissolved in 500 ml. of hot dioxane and 23.5 g. of 2-(N-allylcarbamyl)phenoxyacetic acid was dissolved in 145 ml. of diethylene glycol, and the two solutions were filtered to remove small amounts of insoluble material. The two filtrates thus obtained were mixed with each other and allowed to stand at room temperature (circa 25° C.) for two days. A very small amount of white solid which had precipitated from solution was removed and the filtrate was concentrated by heating on a steam bath under reduced pressure to remove most of the dioxane. The residue was poured while still warm into 750 ml. of water, and the mixture was allowed to stand. The reaction mixture was decanted from a small amount of gummy precipitate into 500 ml. of water and this solution was placed in a refrigerator for several hours. The white solid which had separated from the solution was then collected on a filter, washed with 50 ml. of water, methanol, and ethyl ether and dried in a vacuum desiccator. There was thus obtained 12.2 g. of 2-{N-2-[2-(2-hydroxyethoxy)ethoxy]-3-hydroxymercuripropylcarbamyl} phenoxyacetic acid. When this acid was further dried at 75° C. for six days, it was converted to the anhydro form having the probable structure

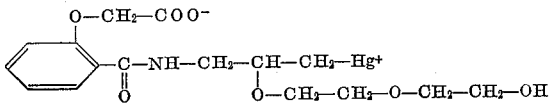

which melted with decomposition at 162–166° C. (cor.). This anhydro form was readily converted by treatment with bases, e. g. sodium carbonate, to yield the same salts obtained when the 2-{N-2-[2-(2-hydroxyethoxy)ethoxy] - 3 - hydroxymercuripropylcarbamyl}phenoxyacetic acid was similarly treated.

I claim:

1. 2-{N-2-[2-(2-hydroxyethoxy)ethoxy] - 3 - hydroxymercuripropylcarbamyl} phenoxyacetic acid, having the formula

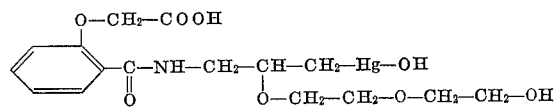

2. Sodium 2-{N-2 - [2 - (2 - hydroxyethoxy)-ethoxy] - 3 - hydroxymercuripropylcarbamyl}-phenoxyacetate, having the formula

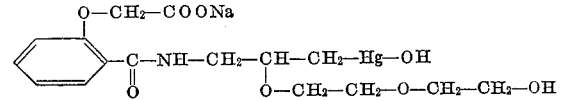

3. In a process for the preparation of a compound having the formula

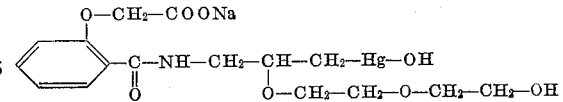

the step which comprises interacting mercuric acetate and 2-(N-allylcarbamyl)phenoxyacetic acid with diethylene glycol.

4. A compound having the formula

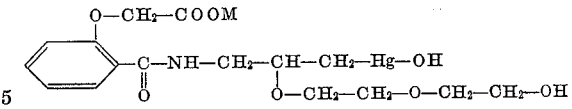

where M is hydrogen or one equivalent of a nontoxic cation.

References Cited in the file of this patent

FOREIGN PATENTS

| Number | Country | Date |
|---|---|---|
| 619,515 | Great Britain | Mar. 10, 1949 |
| 219,010 | Switzerland | May 1942 |

OTHER REFERENCES

Shukis et al.: J. Am. Chem. Soc., vol. 65 (1943), pp. 2365–2366.

Shukis et al.: J. Am. Chem. Soc., vol. 66 (1944), pp. 1462–1464.

Rowland et al.: J. Am. Chem. Soc., vol. 73, pp. 91–93, January 1951.